J. A. GROSHON.
TURBINE.
APPLICATION FILED MAY 7, 1912.
1,082,267.
Patented Dec. 23, 1913.
3 SHEETS—SHEET 1.
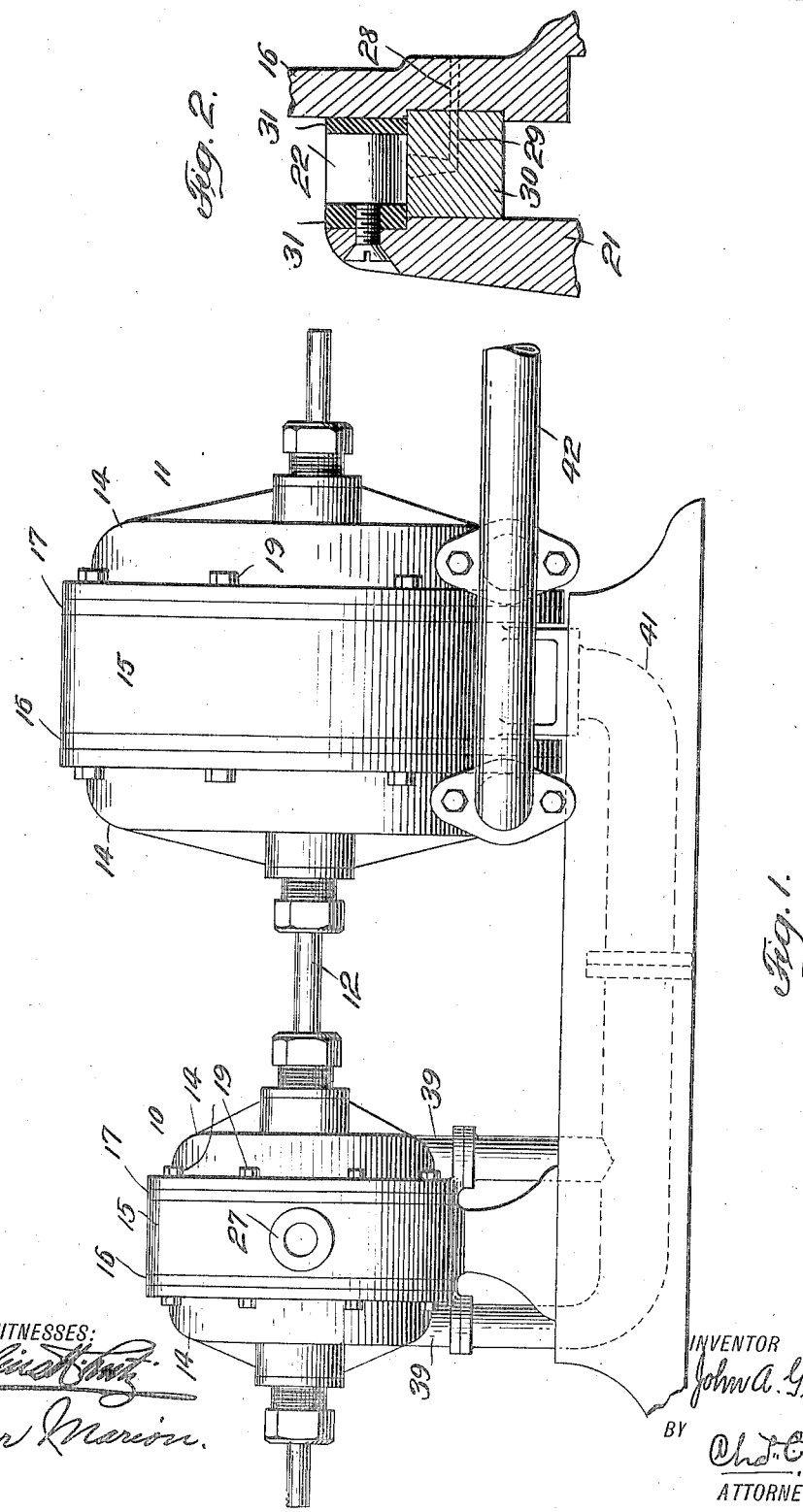
WITNESSES:
INVENTOR
John A. Groshon
BY
ATTORNEY

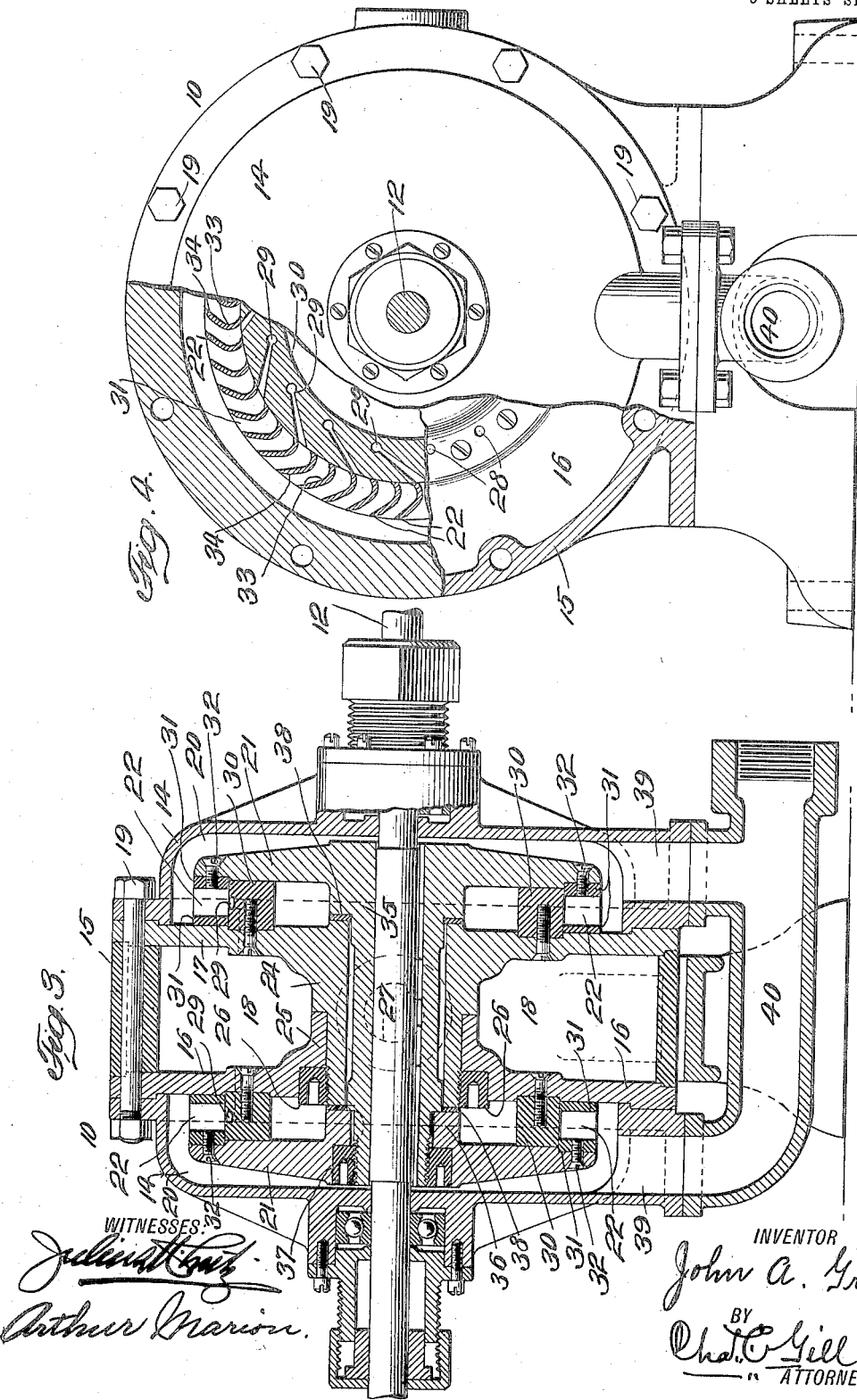

J. A. GROSHON.
TURBINE.
APPLICATION FILED MAY 7, 1912.

1,082,267. Patented Dec. 23, 1913.
3 SHEETS—SHEET 3.

UNITED STATES PATENT OFFICE.

JOHN A. GROSHON, OF NEW YORK, N. Y.

TURBINE.

1,082,267.  Specification of Letters Patent.  Patented Dec. 23, 1913.

Application filed May 7, 1912. Serial No. 695,618.

*To all whom it may concern:*

Be it known that I, JOHN A. GROSHON, a citizen of the United States, and a resident of New York city, in the county of New York and State of New York, have invented certain new and useful Improvements in Turbine-Engines, of which the following is a specification.

The invention relates to improvements in turbine engines, and it consists in the novel features, structure, arrangements and combinations of parts hereinafter described, and particularly pointed out in the claims.

The object of the invention is to provide a turbine engine of high efficiency and capable of ready manufacture.

The engine of my invention is one in which the parts are of great durability and in which the rotating members are nicely balanced so as to assure ease of operation.

The engine provided by me may be used in multiple with a common shaft so that the steam may be employed expansively, the engines increasing in size in series to admit of the expansion of the steam from one engine to another.

Figure 5:
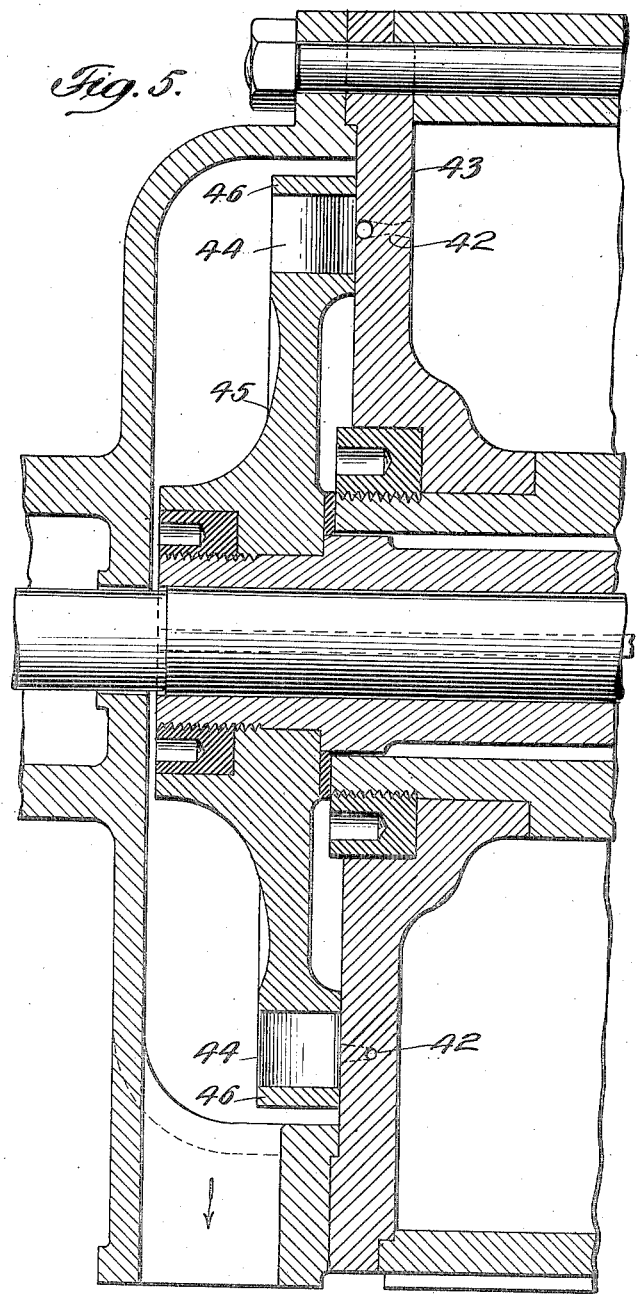
Figure 6:
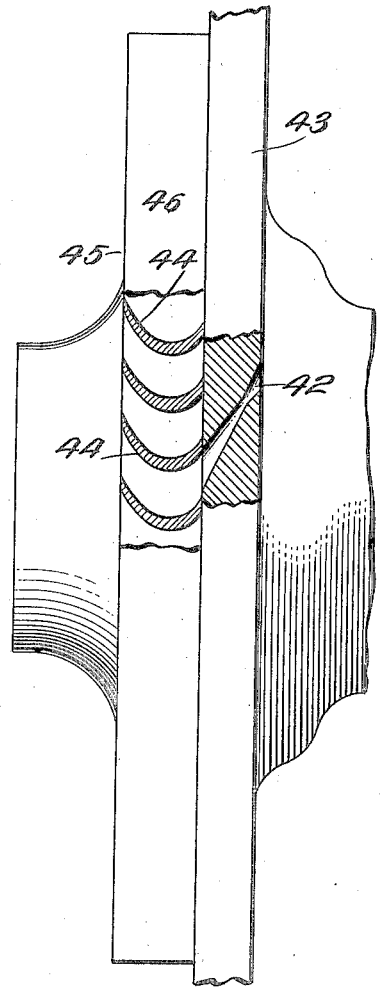

The invention will be fully understood from the detailed description hereinafter presented, reference being had to the accompanying drawings, in which:

Figure 1 is a side elevation of an engine constructed in accordance with and embodying the invention, two of the turbines being illustrated with provision for the steam expanding from the smaller to the larger thereof; Fig. 2 is a detached sectional view through a portion of one of the rotating driving disks, with an adjacent portion of a stationary separating partition or plate; Fig. 3 is a vertical longitudinal section through the engine illustrated at the left hand side of Fig. 1; Fig. 4 is a partial transverse section through the same, the upper portion of the section being through one of the rotating disks carrying the vanes and the lower sectional portion through the center of the main inclosing casing; Fig. 5 is an enlarged sectional view through a portion of the engine and illustrates a modified construction of the rotating disks carrying the vanes, and Fig. 6 is an edge view, partly in section, of the modified rotary disk and a portion of the adjacent stationary separating or steam plate or partition.

In the drawings, 10, 11 designate two of the turbines arranged to drive a shaft 12 common to both of them, and the turbine 11 being larger than that numbered 10 and arranged to receive the exhaust steam leaving the turbine 10 and to be driven thereby. The turbines 10, 11 are mounted upon a suitable base and the details of their internal construction may be understood on reference to Figs. 2, 3 and 4, which show the turbine 10.

The casings of the turbines each comprises two side-plates 14, an annular ring 15 and two partition or steam-plates 16, 17 which form between them an annular steam-chamber 18 and at their peripheral edges are between the edges of the ring 15 and outer edges of the side plates 14, the plates 14, ring 15 and plates 16, 17 being firmly secured together by bolts 19. Within the side-plates 14 are formed chambers 20 within which are disposed the rotary disks 21 carrying the vanes 22 and connected with the shaft 12 to be driven. The partition disks or plates 16, 17 are preferably two parts or sections, as shown, the plate 17 having a hub 24 recessed to receive upon it the hub portion 25 of the plate 16 and said plate 16 at the outer edges of its hub portion being annularly recessed to receive a ring 26 screwed upon the outer end of the hub 24 and serving to bind the hub 25 in rigid position on said hub 24. The partition plates 16, 17 form between them, as aforesaid, an annular steam-chamber 18 to which, with respect to the turbine 10, the steam is admitted through an inlet 27 in the ring 15. and from which the steam may escape only through an annular series of ports 28 (Fig. 2) formed therein and communicating with a series of ports 29 formed in rings 30 rigidly secured to the outer faces of the said plates 16, 17 by means of screws, as shown in Fig. 3. The ports 28 in the plates 16, 17 extend horizontally and are not shown in Fig. 3 because the presence of the screws holding the rings 30 prevents the ports from being illustrated therein. The ports 29 in the rings 30 are horizontal through a portion of their length and then turn right-angularly and slant outwardly and preferably in their outer or discharge portions they are enlarged outwardly, as shown in Figs. 2 and 4. The vanes 22 are of special shape and may be formed integrally with and between or secured to the facing sides of two parallel flat bands 31, which, with the vanes 22, constitute rings secured by screws 32 to the facing sides of the disks 21 and concentrically with the outer edges thereof. The rings of vanes 22 project inwardly and encompass the rings 30 secured to the partition plates 16, 17, the vanes at their inner edges being in very close relation to the outer surfaces of the rings 30, as shown in Figs. 3 and 4, so that the steam discharging through the ports 29 in the rings 30, may strike said vanes and effect the rotation of the disks 21 and shaft 12.

The special form of the vanes 22 is illustrated in Fig. 4, in which it will be seen that the vanes correspond with one another in all essential respects and are reasonably close together and extend entirely around the rings 30, and that each vane has a bucket portion 33 near the rings 30 and a reversely inclined outer portion 34, the portion 34 being inclined backwardly or reversely to the direction of motion of the ring of vanes and also reversely to the direction of the ports 29 in the rings 30.

The action of the steam against the vanes 22 will be understood on reference to Fig. 4, wherein it will be seen that during the rotation of the disks 21 the vanes will be carried along the discharge ends of the series of ports 29 and receive the impact of the steam jets passing from said ports. The disks 21 are driven by the direct impact of the steam against the vanes 22 and by the reaction occurring on the passage of the steam from between the vanes and its action against the front faces of the reversely inclined portions 34 of the vanes, said portions 34 being of greater extent than that portion of the vanes inwardly beyond the buckets 33, so as to afford a maximum surface against which the steam may act.

The rotary disks 21 correspond with one another except at their hub portions. One of the disks 21 is formed with an extended hub portion 35 which receives the partition plates 16, 17 and projects beyond the same and has secured upon its outer end the other disk 21, whose hub portion 36 passes upon the end of the hub 35 and is annularly grooved to receive the ring nut 37 which is screwed upon the end of the hub 35 and retains the disk-hub 36 upon the hub 35, as shown in Fig. 3. The manner of connecting the disks 21 together is substantially the same as that employed for securing the partition plates 16, 17 together. Suitable gaskets 38 are provided between the ends of the hub 24 of the plate 17 and the adjacent portions of the disks 21 which abut against the ends of said hub.

The operation of the engine will be readily understood without detailed explanation. Steam admitted through the inlet 27 of the engine casing (10) will fill the chamber 18 between the plates 16, 17 and pass through the annular series of ports 28 in said plates into the ports 29 formed in the rings 30 secured to said plates and thence the steam escaping in jets from the ports 29 will strike the vanes 22 of the rotary disks 21 and cause said disks to rotate, and these disks being keyed or otherwise connected with the shaft 12, will drive the same, the rotation of the disks 21 and shaft 12 being continuous so long as the steam is driven into the steam chamber 18. The steam after having acted on the vanes 22 will pass into the general steam chambers 20 containing the disks 21 and escape through the outlets 39 leading therefrom and enter a main exhaust pipe 40. I prefer to use the turbine in series so as to employ the steam expansively, and hence in Fig. 1 I illustrate the turbine 11 as connected with the same shaft that is driven by the turbine 10 and also indicate a pipe connection 41 for leading the exhaust steam from the chambers 20 of the turbine 10 into the main steam chamber between the partition plates of the turbine 11 so that said steam may be used expansively and drive the disks of the turbine 11.

The interior construction of the turbine 11 corresponds exactly with that of the turbine 10 and will be understood from Figs. 3 and 4. The exhaust from the turbine 11 is through the pipe 42, which may, if desired, lead to the main steam chamber of a further turbine of larger size than the turbine 11, the purpose being to use the steam until its force has become exhausted for driving purposes.

Figs. 5 and 6 illustrate a modification of the invention, in which I dispense with the rings 30 of the engine shown in Figs. 3 and 4 and extend the steam ports 42 through the partition plates 43 to vanes 44 of the rotary disk 45 connected with the driving shaft in the same way that the left hand disk in Fig. 3 is connected with the driving shaft. The vanes 44 in Figs. 5 and 6 are formed between the body of the disk 45 and a peripheral rim or band 46 thereon, said vanes being thus in the vertical plane of the disk 45 instead of, as in the construction shown in Fig. 3, formed in rings secured to the facing sides of the driving disks. The vanes 44 are substantially in outline like the vanes 22, and the modification shown will be understood without further detailed explanation, since it consists mainly in omitting the rings 30 and forming the vanes 44 directly on the outer circumferential portions of the disks 45 instead of separate rings to be screwed to said disks.

Among the more important features of my invention it may be mentioned that the partition plates 16, 17 connected and secured together in the manner shown and hereinbefore explained, form a very durable readily created structure forming between them the steam chamber 18 and that in the arrangement of the auxiliary steam chambers 20 and rotary disks 21 opposite to each other at the outer sides of the partition plates 16, 17, I produce a turbine whose rotary members are nicely balanced.

The engine as a whole has been constructed with the view of great durability and lack of complexity and to an arrangement and disposition of parts assuring great efficiency.

What I claim as my invention and desire to secure by Letters Patent, is:

1. A turbine engine comprising partition plates forming between their facing sides a steam-chamber and having at their outer sides concentric laterally projecting rings and being formed with steam-ports extending from said chamber into said rings and thence outwardly through peripheral portions of said rings, disk-chambers at the outer sides of said plates provided with exhaust outlets for steam, a shaft to be driven extending transversely of said chambers, and disks on said shaft in said disk-chambers having on their inner faces laterally projecting rings of vanes extending over said rings on said partition plates to be acted on by the steam which passes through said ports, for rotating said disks and shaft.

2. A turbine engine comprising partition plates forming between their facing sides a steam-chamber and having at their outer sides concentric laterally projecting rings and being formed with steam-ports extending from said chamber into said rings and thence outwardly through peripheral portions of said rings, disk-chambers at the outer sides of said plates provided with exhaust outlets for steam, a shaft to be driven extending transversely of said chambers, and disks on said shaft in said disk-chambers having on their inner faces laterally projecting rings of vanes extending over said rings on said partition plates to be acted on by the steam which passes through said ports, for rotating said disks and shaft, the spaces between said vanes being closed at opposite vertical edges and open at their other opposite edges, and said vanes having bucket portions to receive the impact of the steam-jets issuing from said ports and reversely extended outer portions.

3. A turbine engine comprising partition plates forming between them a steam-chamber and having concentric series of steam-ports extending therethrough and laterally projected hub portions one upon the other, the hub of one plate extending through and receiving the hub of the other plate and being threaded to receive a ring-nut adapted to an annular recess in said other plate, disk-chambers at the outer sides of said plates provided with exhaust outlets for steam, a shaft to be driven extending transversely of said chambers, and disks on said shaft in said disk-chambers having along their peripheral portions vanes to be acted on by the steam which enters said ports, said disks having hub portions mounted one upon the other, the hub of one disk being secured to said shaft and extending through the other disk and the hub portion thereof and threaded at its outer end to receive a ring-nut adapted to an annular recess in said other disk.

Signed at New York city, in the county of New York, and State of New York, this 4th day of May A. D. 1912.

JOHN A. GROSHON.

Witnesses:
ARTHUR MARION,
CHAS. C. GILL.